US009379833B2

(12) United States Patent
Nakajima

(10) Patent No.: US 9,379,833 B2
(45) Date of Patent: Jun. 28, 2016

(54) TRANSMITTER, TRANSMISSION METHOD, AND NON-TRANSITORY COMPUTER-READABLE MEDIUM STORING PROGRAM

(75) Inventor: Hiroaki Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 141 days.

(21) Appl. No.: 14/356,370

(22) PCT Filed: Aug. 1, 2012

(86) PCT No.: PCT/JP2012/004889
§ 371 (c)(1),
(2), (4) Date: May 5, 2014

(87) PCT Pub. No.: WO2013/069176
PCT Pub. Date: May 16, 2013

(65) Prior Publication Data
US 2014/0307728 A1    Oct. 16, 2014

(30) Foreign Application Priority Data

Nov. 9, 2011    (JP) .................................. 2011-245306

(51) Int. Cl.
*H04J 3/06* (2006.01)
*G04R 20/14* (2013.01)
*H04W 56/00* (2009.01)

(52) U.S. Cl.
CPC ............... *H04J 3/0682* (2013.01); *G04R 20/14* (2013.01); *H04J 3/0667* (2013.01); *H04W 56/003* (2013.01); *H04W 56/0055* (2013.01)

(58) Field of Classification Search
CPC ...... H04J 3/0682; H04J 3/0667; G04R 20/14; H04W 56/003; H04W 56/0055
See application file for complete search history.

(56) References Cited

U.S. PATENT DOCUMENTS 5,710,765 A *   1/1998   Lee ..................... H04N 7/17309
                                                           348/E7.07
6,621,819 B1 *  9/2003   Coppola ............ H04Q 11/0478
                                                           370/395.1

(Continued)

FOREIGN PATENT DOCUMENTS

JP         2003-298630 A    10/2003
JP         2006-50319 A      2/2006

(Continued)

OTHER PUBLICATIONS

International Search Report (ISR) (PCT Form PCT/ISA/210), in PCT/JP2012/4889, dated Nov. 6, 2012.

*Primary Examiner* — Robert Wilson
(74) *Attorney, Agent, or Firm* — McGinn IP Law Group, PLLC

(57) ABSTRACT

A transmitter is connected to a master device, and wirelessly transmits a timing packet, which is transmitted from the master device, to a receiver. The transmitter includes: an input unit for receiving an input of a timing packet from the master device; a delay compensation unit for obtaining a packet length of the timing packet and a modulation system used for radio transmission, calculating a device-specific delay value and a first propagation delay value based on the modulation system and the packet length, and calculating a delay compensation value based on the device-specific delay value and the first propagation delay value; a filter unit for adding the delay compensation value to a specific field of the timing packet; and an output unit for outputting the timing packet to the receiver.

14 Claims, 7 Drawing Sheets

(56) References Cited

U.S. PATENT DOCUMENTS

2009/0311979 A1* 12/2009 Husted ................ H03C 5/00
455/102
2014/0307728 A1* 10/2014 Nakajima ............ H04J 3/0682
370/350

FOREIGN PATENT DOCUMENTS

| JP | 2010-206327 A | 9/2010 |
|----|---------------|--------|
| WO | WO 2006/106692 A1 | 10/2006 |

* cited by examiner

US 9,379,833 B2

TRANSMITTER, TRANSMISSION METHOD, AND NON-TRANSITORY COMPUTER-READABLE MEDIUM STORING PROGRAM

TECHNICAL FIELD

The present invention relates to a transmitter, a transmission method, and a non-transitory computer-readable medium storing a program, and more particularly, to a technique for performing delay compensation in accordance with switching of a modulation system.

BACKGROUND ART

Various methods have been proposed for synchronizing the clock frequency and time of a plurality of devices by using a burst signal having no synchronization information, such as a packet. There are standard specifications such as IETF Network Time Protocol (NTP), IEEE 1588-2002 Precision Time Protocol (PTP) version. 1, ITU-TG. 8282/Y. 1362 Synchronous Ethernet®, and Pseudo Wire Emulation Edge to Edge (PWE3).

When high-precision synchronization of the clock frequency and time is required, the communication standards, such as TDD LTE, which require a frequency precision in units of ppb and a time precision in units of μs, employ a method such as IEEE 1588-2008 PTP version. 2, or a method of synchronizing with Global Navigation Satellite Systems (GNSS) in each device.

In IEEE 1588 PTP, a master device transmits a timing packet to a slave device and the slave device performs processing for reproducing the frequency and time of the slave device based on a time stamp value included in the packet. At this time, the propagation delay itself of the timing packet and a fluctuation in the delay affect the synchronization accuracy.

In view of this, IEEE recommends a method of compensating for a delay in a slave device by adding a propagation delay due to a physical transmission rate between devices and a buffer retention period within devices to a specific field of a timing packet.

In a similar technique, Patent Literature 1 discloses a system in which a master station device and a slave station device perform time synchronization by using Gigabit Ethernet-Passive Optical Network (GE-PON), which is an asynchronous multiplex transmission system. In the system, the master station device periodically notifies the slave station device of synchronization signals, and also notifies the slave station device of a propagation delay time based on a physical transmission distance to the slave station device. This enables time synchronization with high precision even when a plurality of slave station devices are arranged at different distances.

As a solution to the problem of a fluctuation in the propagation delay, IEEE 1588 also proposes a method in which a transmission device located on the transmission side adds, to a specific field of a timing packet, a link delay that is determined by factors including a retention period of packets in a transmission device, such as a buffer in a layer 2 switch, on a transmission path, a transmission rate of a physical line, such as 10/100/1000 BASE, which constitutes the transmission path, and a packet length. This makes it possible to compensate for a fluctuation in the delay caused due to buffering or line redundancy switching.

CITATION LIST

Patent Literature

[Patent Literature 1] Japanese Unexamined Patent Application Publication No. 2010-206327

SUMMARY OF INVENTION

Technical Problem

The above-mentioned method of compensating for a fluctuation in the propagation delay as specified in IEEE 1588 assumes a route change due to, for example, switching of a redundant line. Specifically, the method employs a system in which a propagation delay is measured in advance for each delivery port of a transmission device, and when the delivery port is changed, the propagation delay to be used is changed. Thus, in this method, the period for updating the propagation delay is long.

For example, FIG. 7 shows a configuration of a transmitter 70 that calculates a propagation delay in accordance with the recommendation of IEEE 1588 PTP.

In the transmitter 70, a packet switch unit 21 receives timing packets from a user network 10, and outputs a packet addressed to the transmitter 70 to a timing processing unit 22 and outputs a packet addressed to a device other than the transmitter 70 to a radio framer unit 25. The packet switch unit 21 measures a retention period in an internal buffer, and adds the retention period to a specific field of the timing packet.

The transmitter 70 measures a propagation delay in a propagation path from the packet switch unit 21 to each delivery destination, for example, a receiver 30, by using a control packet in accordance with the recommendation of the IEEE 1588 PTP. Generally, according to the recommendation of IEEE 1588 PTP, a propagation delay in a propagation path is obtained as a static value on the premise that the transmission capacity and propagation distance of the propagation path are constant, and even a long-period measurement period is satisfactorily used.

On the other hand, an adaptive modulation system is widely employed in the field of radio transmission. The adaptive modulation system is a communication system in which a modulation system having a high resistance to a fluctuation of a radio transmission path and having a small transmission capacity is used when the quality of the radio transmission path has deteriorated, and the modulation system is automatically switched to a modulation system having a low resistance to a fluctuation of the radio transmission path and having a large transmission capacity when the quality of the radio transmission path has improved. Appropriate switching of the modulation systems in this manner allows the adaptive modulation system to satisfy both the quality and the transmission capacity of the radio transmission path.

In a radio transmission device employing the adaptive modulation system, the modulation system of the radio transmission path, i.e., the transmission capacity, may be dynamically changed in units of radio frame, due to weather conditions and the like. In this case, the propagation delay may also be changed in units of radio frame according to the change of the transmission capacity. For this reason, in the measurement of a delay for a long period of time by using the control packet described above, the actual fluctuation in the propagation delay cannot be sufficiently followed.

Further, a radio transmission using the adaptive modulation system requires processing, such as radio framing, analog modulation/demodulation, and frequency conversion, unlike a transmission via a wire. Accordingly, a delay component specific to each modulation system is present. On the other hand, in the technique of measuring a transmission delay as specified in the recommendation of IEEE 1588, a total propagation delay between endpoint nodes is merely measured, and components such as a specific delay within each transmission device and a distance between radio sections are not taken into consideration. Thus, in this technique, it is difficult to calculate a delay time based on a delay component specific to each modulation system.

The present invention has been made to solve the above-mentioned problems, and an object of the present invention is to provide a transmitter, a transmission method, and a non-transitory computer-readable medium storing a program, which are capable of performing delay compensation in accordance with switching of a modulation system.

Solution to Problem

A transmitter according to an exemplary aspect of the present invention includes: input means for receiving an input of a timing packet from a master device; delay compensation means for obtaining a packet length of the timing packet and a modulation system used for radio transmission, calculating a device-specific delay value and a first propagation delay value based on the modulation system and the packet length, and calculating a delay compensation value based on the device-specific delay value and the first propagation delay value; filter means for adding the delay compensation value to a specific field of the timing packet; and output means for wirelessly transmitting the timing packet to a receiver.

A transmission method according to an exemplary aspect of the present invention includes: a calculation step of calculating a device-specific delay value and a first propagation delay value based on a packet length of a timing packet and a modulation system used for radio transmission, and calculating a delay compensation value based on the device-specific delay value and the first propagation delay value; an addition step of adding the delay compensation value to a specific field of the timing packet; and an output step of wirelessly transmitting the timing packet to a receiver.

A non-transitory computer-readable medium storing a program according to an exemplary aspect of the present invention stores a program that causes a computer to execute: a calculation step of calculating a device-specific delay value and a first propagation delay value based on a packet length of a timing packet and a modulation system used for radio transmission, and calculating a delay compensation value based on the device-specific delay value and the first propagation delay value; an addition step of adding the delay compensation value to a specific field of the timing packet; and an output step of wirelessly transmitting the timing packet to a receiver.

Advantageous Effects of Invention

According to the present invention, it is possible to provide a transmitter, a transmission method, and a non-transitory computer-readable medium for storing a program, which are capable of performing delay compensation in accordance with switching of a modulation system.

DESCRIPTION OF EMBODIMENTS

Hereinafter, specific embodiments of the present invention will be described in detail with reference to the drawings.

First Exemplary Embodiment

Figure 1:
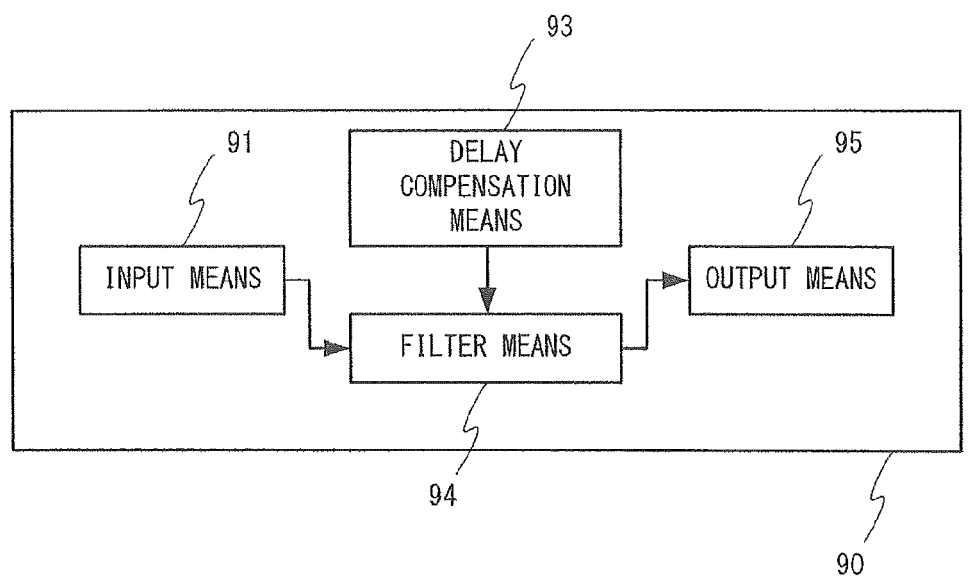
FIG. 1 is a block diagram of a transmitter according to a first exemplary embodiment.

Referring first to FIG. 1, a configuration of a transmitter according to a first exemplary embodiment of the present invention will be described.

A transmitter 90 is a device that wirelessly transmits received data packets as radio frames to a receiver which is an opposite radio station (not shown). Typically, the transmitter 90 is connected to a user network A (not shown), and receives the input of data packets from the user network A. The transmitter 90 wirelessly transmits the data packets to a receiver 30. The receiver 30 is connected to a user network B (not shown), and outputs the received data packets to the user network B. Assume that in this exemplary embodiment, the receiver 30 has a configuration similar to that of a transmitter 20.

The transmitter 90 according to this exemplary embodiment includes at least input means 91, delay compensation means 93, filter means 94, and output means 95.

The input means 91 is connected to an external device or a network (the user network A in this exemplary embodiment), and receives an input of a LAN input signal from the user network A. The LAN input signal includes a timing packet output from a master device in IEEE 1588 PTP which is present in the user network A.

The delay compensation means 93 receives, from a predetermined source, an input of a packet length of the timing packet and a radio modulation system used for radio transmission. The above-mentioned source may be, for example, another processing means for analyzing packets or acquiring a radio modulation system in the transmitter 90, or input means for inputting these pieces of information from the outside of the transmitter 90. The delay compensation means 93 calculates a device-specific delay value and a propagation delay value by a predetermined method to be described later, by using these pieces of information as parameters, and calculates a delay compensation value based on these values.

The filter means 94 adds the delay compensation value, which is calculated by the delay compensation means 93, to a specific field of the timing packet.

The output means 95 performs modulation into a frame, frequency conversion, and the like on the timing packet to which the delay compensation value is added, and outputs the timing packet to the receiver as a radio output signal.

Figure 2:
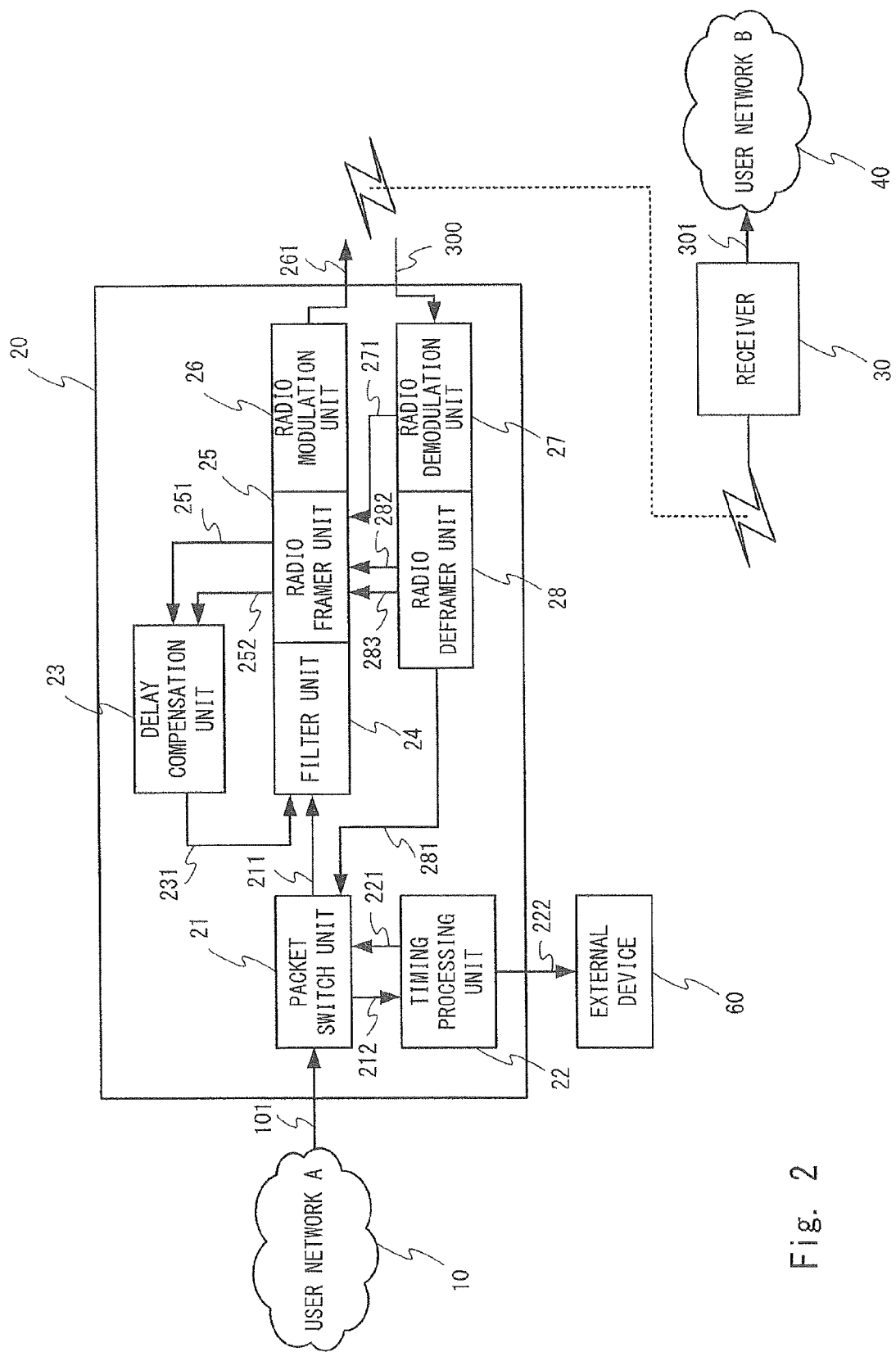
FIG. 2 is a block diagram of the transmitter according to the first exemplary embodiment.

Referring to FIG. 2, the configuration of the transmitter 20, which is a more detailed implementation example of the transmitter 90 of the first exemplary embodiment, will be described.

The transmitter 20 includes a packet switch unit 21 serving as the input means 91, a delay compensation unit 23 serving as the delay compensation means 93, a filter unit 24 serving as the filter means 94, and a radio framer unit 25 and a radio modulation unit 26, each of which serves as the output means 95.

The transmitter 20 may also include a radio demodulation unit 27, which receives a radio signal from the receiver 30 serving as an opposite radio station, and a radio deframer unit 28.

In addition, the transmitter 20 may include a timing processing unit 22 that processes a timing packet addressed to the transmitter 20, when the timing packet addressed to the transmitter 20 is included in the timing packet received from the user network A 10.

Next, processing in the transmitter 20 will be described.

(1) The packet switch unit 21 receives an input of a LAN input signal 101 from the user network A 10. The LAN input signal 101 includes a timing packet output by the master device in IEEE 1588 PTP which is present in the user network A 10. The packet switch unit 21 transfers the LAN input signal 101 to the filter unit 24.

When the LAN input signal 101 includes both a timing packet for the transmitter 20 and a timing packet for a device other than the transmitter 20, the packet switch unit 21 may allocate the timing packet for the transmitter 20 to the timing processing unit 22 as a terminal timing packet signal 212, and may allocate the LAN input signal 101 including the timing packet for a device other than the transmitter 20 to the filter unit 24.

In this case, the timing processing unit 22 can reproduce a clock frequency and a time based on a time stamp value within the allocated timing packet for the transmitter 20. Further, the timing processing unit 22 may generate a timing packet to be delivered to the above-mentioned master device, and may output the generated timing packet as a generated timing packet signal 221 to the packet switch unit 21. Furthermore, the timing processing unit 22 may output, to an external device 60, the reproduced clock, timing pulse, time data, or the like as a timing signal 222 based on IEEE 1588 PTP.

In IEEE 1588 PTP, a propagation delay due to buffer retention or a transmission rate of a physical line is added to a specific field of a timing packet, and a slave station adds a time stamp value within the timing packet to a compensation value for the specific field, thereby making it possible to obtain a time stamp of a master station to which the propagation delay is added. Also in this exemplary embodiment, the same function can be obtained by providing the timing processing unit 22.

(2) The filter unit 24 receives a LAN input signal 211 from the packet switch unit 21 and transfers the LAN input signal to the radio framer unit 25.

(3) The radio framer unit 25 outputs, to the delay compensation unit 23, the timing packet included in the LAN input signal 211, as a transmission radio frame pulse signal 251. Further, the radio framer unit 25 receives an opposite reception state signal 283 from the radio deframer unit 28 to be described later. The radio framer unit 25 determines the modulation system, with which a maximum transmission capacity can be realized without causing any error, based on the received power of the receiver 30 and an error detection result for each radio frame, which are included in the opposite reception state signal 283, and notifies the delay compensation unit 23 of the modulation system as a radio modulation system notification signal 252.

Operations of the radio demodulation unit 27 and the radio deframer unit 28 will now be described.

The radio demodulation unit 27 receives a radio input signal 300 from the receiver 30, and outputs, to the radio framer unit 25, the received power as a radio received power signal 271.

The radio deframer unit 28 performs frequency conversion and demodulation on the radio input signal 300, thereby obtaining a radio frame. The radio deframer unit 28 outputs, to the packet switch unit 21, a main signal packet separated from the radio frame, as a separated LAN signal 281. On the other hand, upon detecting an error from the radio frame, the radio deframer unit 28 outputs a radio error detection signal 282 to the radio framer unit 25. Further, the radio deframer unit 28 separates radio receiving power, which is detected by the receiver 30 and is multiplexed on the radio frame, from the radio frame, and outputs the power to the radio framer unit 25 as the opposite reception state signal 283.

(4) The delay compensation unit 23 receives, from the radio framer unit 25, the transmission radio frame pulse signal 251 and the radio modulation system notification signal 252. The delay compensation unit 23 calculates an in-device fixed delay based on the radio modulation system indicated by the radio modulation system notification signal 252. The delay compensation unit 23 also calculates a propagation delay based on the packet length of the timing packet received as the transmission radio frame pulse signal 251, the above-mentioned radio modulation system, and a transmission distance.

The in-device fixed delay and the propagation delay can be calculated in the following manner. For example, in the case of calculating the in-device fixed delay, a table or the like for associating the radio modulation system with the in-device fixed delay may be stored in a given storage means in advance, and the delay compensation unit 23 may be configured to specify the in-device fixed delay corresponding to the radio modulation system by referring to the table. Alternatively, a predetermined formula, function, or the like using a parameter representing the radio modulation system as a variable or an argument may be defined in advance, and the delay compensation unit 23 may be configured to obtain the in-device fixed delay by giving the parameter representing the radio modulation system to the above-mentioned formula, function, or the like as a variable or an argument. Note that a similar configuration can be used for calculation of the propagation delay.

The delay compensation unit 23 calculates the delay compensation value based on the in-device fixed delay and propagation delay calculated as described above. Typically, the delay compensation value can be calculated by adding up the in-device fixed delay and the propagation delay. The delay compensation unit 23 outputs this delay compensation value to the filter unit 24 as a delay compensation signal 231.

(5) The filter unit 24 receives the delay compensation signal 231, which is received from the delay compensation unit 23, and obtains the delay compensation value. The filter unit 24 adds this delay compensation value to a specific field of the timing packet, and outputs it to the radio framer unit 25.

(6) The radio framer unit 25 notifies the radio modulation unit 26 of the modulation system determined as described above, and outputs the timing packet as a radio frame. At this time, the radio framer unit 25 may receive the radio received power signal 271 from the radio demodulation unit 27 to be described later and the radio error detection signal 282 from the radio deframer unit 28, and may perform processing for multiplexing bits for error detection on the radio frame.

(7) The radio modulation unit 26 performs analog modulation in the radio modulation system determined by the radio framer unit 25 and frequency conversion into a radio frequency on the radio frame generated by the radio framer unit 25, and outputs it to the receiver 30 as a radio output signal 261.

Figure 3:
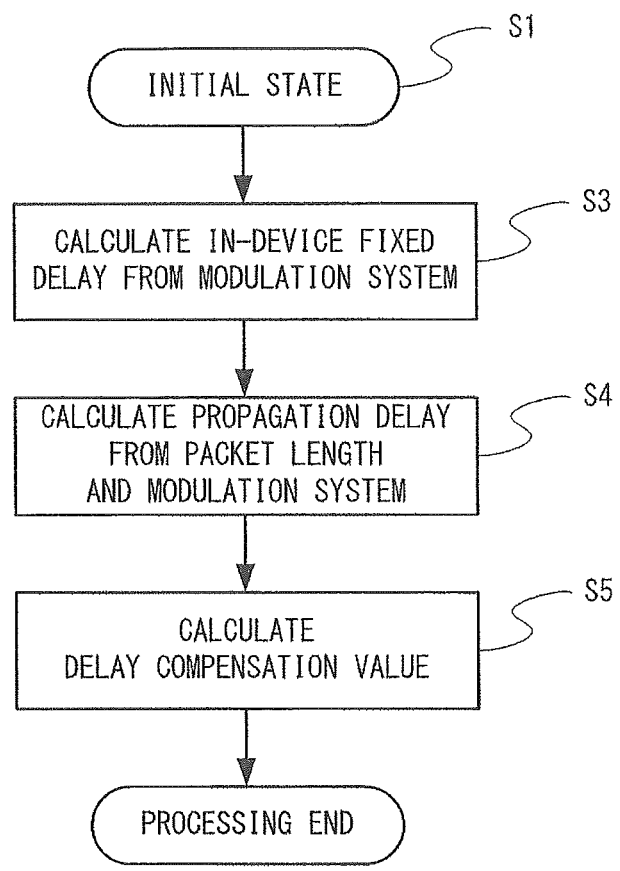
FIG. 3 is a flowchart showing processing of the transmitter according to the first exemplary embodiment.

Each step of the operation of the delay compensation unit 23 in the above item (4) will now be described with reference to FIG. 3.

(S1) The transmitter 20 is activated to start processing.

(S3) The delay compensation unit 23 obtains the modulation system of the radio frame from the radio framer unit 25, and calculates the in-device fixed delay which is preliminarily set for each modulation system.

(S4) The delay compensation unit 23 obtains the timing packet from the radio framer unit 25. The delay compensation unit 23 calculates the propagation delay based on the packet length of this timing packet and the above-mentioned modulation system, i.e., the transmission capacity.

(S5) The delay compensation unit 23 calculates the delay compensation value based on the above-mentioned in-device fixed delay and propagation delay, and outputs the delay compensation value to the filter unit 24 as the delay compensation signal 231.

In this exemplary embodiment, based on the packet length of the timing packet received from the input means 91 and the radio modulation system, the delay compensation means 93 calculates the delay compensation value, the filter means 94 adds the delay compensation value to the timing packet, and the output means 95 delivers the timing packet, thereby making it possible to perform delay compensation depending on the radio modulation system and the packet length of the timing packet. Further, the above-mentioned configuration enables real-time compensation of a fluctuation in the propagation delay due to dynamic switching of radio bands by an adaptive modulation system.

Second Exemplary Embodiment

Figure 4:
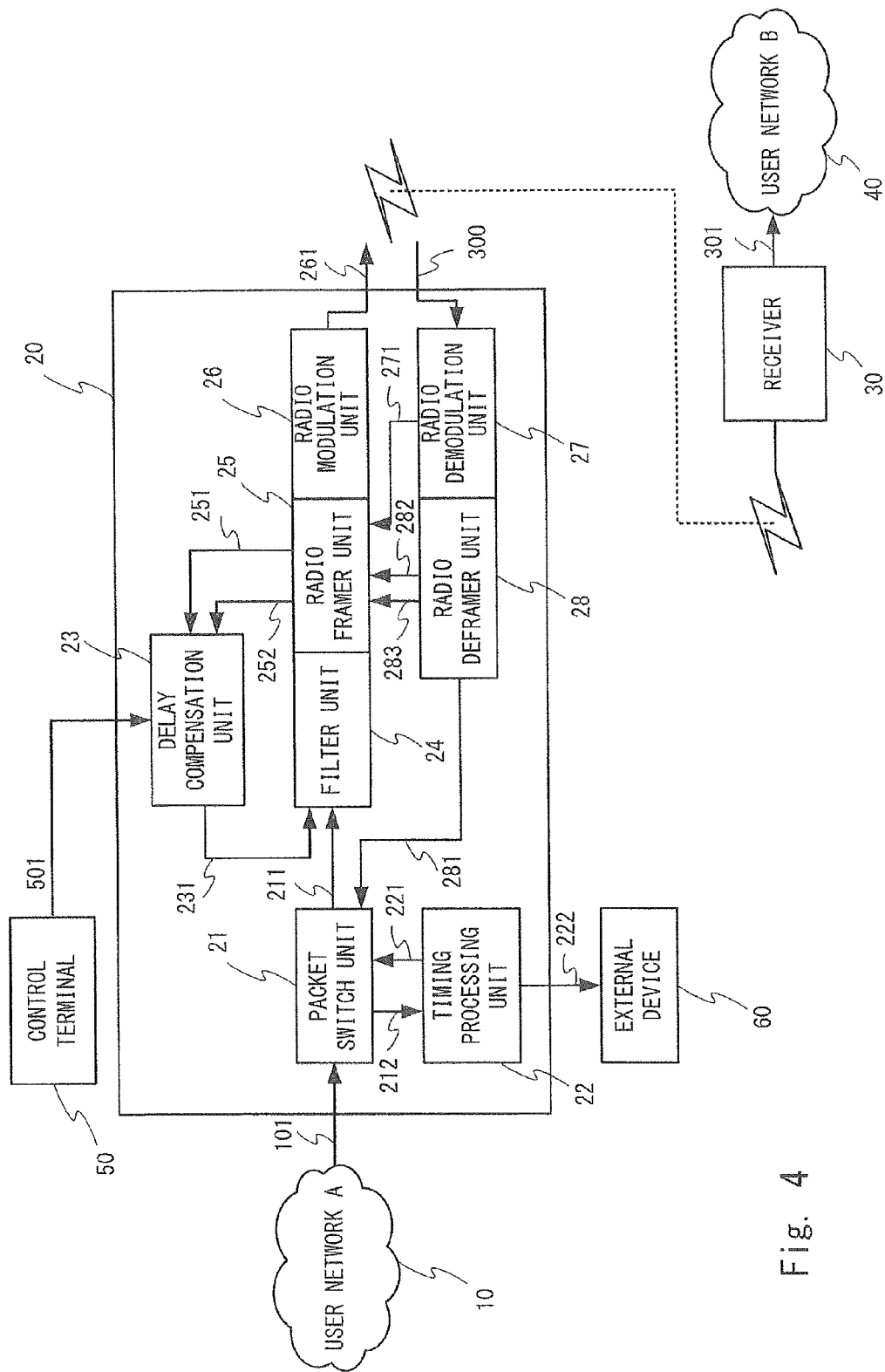
FIG. 4 is a block diagram of a transmitter according to a second exemplary embodiment.

Referring to FIG. 4, the configuration of the transmitter 20 according to a second exemplary embodiment of the present invention will be described.

The transmitter 20 according to the second exemplary embodiment has a feature that the delay compensation unit 23 is configured to be able to receive an input from a control terminal 50. The other components are similar to those of the first exemplary embodiment described above.

The control terminal 50 is typically a computer operable by an operator. Information input from the control terminal 50 is output to the delay compensation unit 23. In this exemplary embodiment, a transmission distance to the receiver 30 is supplied as input information to the delay compensation unit 23.

Although this exemplary embodiment is described assuming that the control terminal 50 is provided outside of the transmitter 20, the configuration is not limited to this. For example, in place of the control terminal 50, a predetermined storage area may be provided inside or outside of the transmitter 20 to store the above-mentioned transmission distance in the storage area, and the delay compensation unit 23 may obtain the transmission distance by referring to the storage area. The transmission distance may be input from the control terminal 50 only during installation work for the transmitter 20, for example, and subsequently, the above-mentioned transmission distance may be stored in the storage area and the delay compensation unit 23 may refer to the storage area.

Next, processing of the transmitter 20 according to this exemplary embodiment will be described. Note that this exemplary embodiment is characterized by the processing set forth in the item (4), and the processings set forth in the items (1) to (3) and (5) to (7) are similar to those of the first exemplary embodiment described above.

(1) The packet switch unit 21 receives the input of the LAN input signal 101 from the user network A 10, and transfers the signal to the filter unit 24.

(2) The filter unit 24 transfers the LAN input signal 211 to the radio framer unit 25.

(3) The radio framer unit 25 outputs, to the delay compensation unit 23, the timing packet included in the LAN input signal 211 and the radio modulation system.

(4) The delay compensation unit 23 receives the transmission radio frame pulse signal 251, the radio modulation system notification signal 252, and a device control signal 501 from the control terminal 50. The delay compensation unit 23 calculates the in-device fixed delay based on the radio modulation system indicated by the radio modulation system notification signal 252. The delay compensation unit 23 calculates the propagation delay based on the packet length of the timing packet received as the transmission radio frame pulse signal 251, the above-mentioned radio modulation system, and the transmission distance.

The propagation delay can be calculated in the following manner. In the case of calculating the propagation delay, a table or the like for associating the packet length, radio modulation system, and transmission distance with the radio modulation system may be stored in a given storage means in advance, and the delay compensation unit 23 may be configured to specify the propagation delay corresponding to the packet length, radio modulation system, and transmission distance, by referring to the table. Alternatively, a predetermined formula, function, or the like using a parameter representing the packet length, radio modulation system, and transmission distance as a variable or an argument may be defined in advance, and the delay compensation unit 23 may be configured to obtain the propagation delay by giving the parameter representing the packet length, radio modulation system, and transmission distance to the above-mentioned formula, function, or the like as a variable or an argument. Note that a similar configuration can be used for calculation of the in-device fixed delay.

The delay compensation unit 23 calculates the delay compensation value based on the in-device fixed delay and propagation delay calculated as described above. Typically, the delay compensation value can be calculated by adding up the in-device fixed delay and the propagation delay. The delay compensation unit 23 outputs the delay compensation value to the filter unit 24 as the delay compensation signal 231.

(5) The filter unit 24 adds the delay compensation value to a specific field of the timing packet, and outputs it to the radio framer unit 25.

(6) The radio framer unit 25 notifies the radio modulation unit 26 of the modulation system determined as described above, and outputs the timing packet as a radio frame.

(7) The radio modulation unit 26 modulates the radio frame by the above-mentioned radio modulation system, and outputs the radio frame to the receiver 30.

Figure 5:
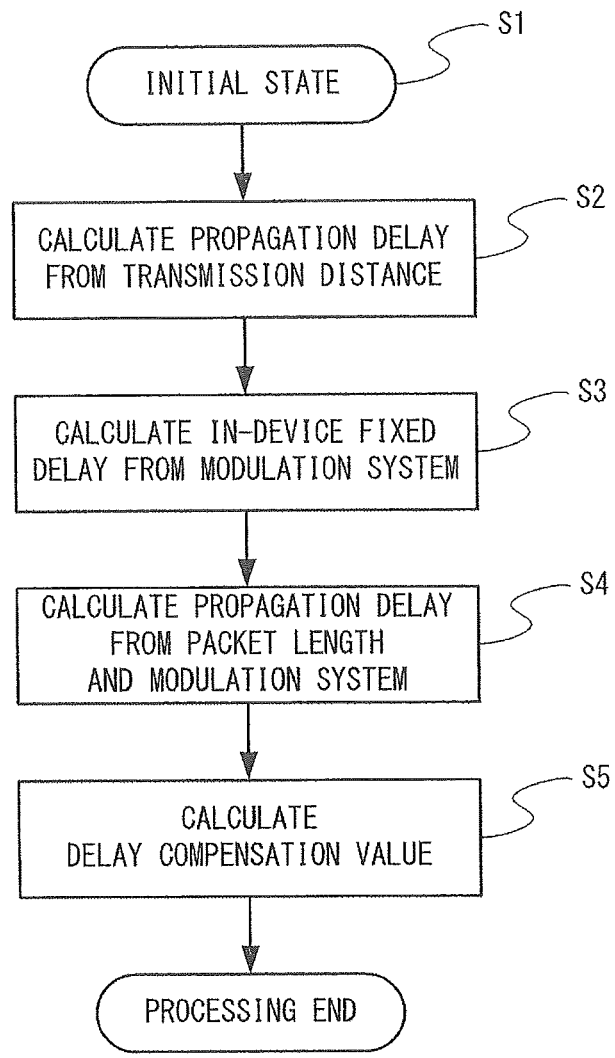
FIG. 5 is a flowchart showing processing of the transmitter according to the second exemplary embodiment.

Each step of the operation of the delay compensation unit 23 in the above item (4) will now be described with reference to FIG. 5. Note that this exemplary embodiment is characterized by the processings in (S1) and (S2), and the processings in (S3) to (S5) are similar to those of the first exemplary embodiment described above.

(S1) In an initial state after activation of the transmitter 20, the delay compensation unit 23 obtains the transmission distance between radio transmission devices from the control terminal 50.

(S2) The delay compensation unit 23 calculates the propagation delay in a radio transmission section based on the obtained transmission distance.

(S3) The delay compensation unit 23 obtains the modulation system of the radio frame from the radio framer unit 25, and calculates the in-device fixed delay which is preliminarily set for each modulation system.

(S4) The delay compensation unit 23 obtains the timing packet from the radio framer unit 25. The delay compensation unit 23 calculates the propagation delay based on the packet length of the timing packet and the above-mentioned modulation system, i.e., the transmission capacity.

(S5) The delay compensation unit 23 calculates the delay compensation value based on the above-mentioned in-device fixed delay and propagation delay, and outputs delay compensation value to the filter unit 24 as the delay compensation signal 231.

In this exemplary embodiment, based on the packet length of the timing packet received from the input means 91, the radio modulation system, and the transmission distance, the delay compensation means 93 calculates the delay compensation value, the filter means 94 adds the delay compensation value to the timing packet, and the output means 95 delivers the timing packet, thereby making it possible to perform delay compensation depending on the radio modulation system, the packet length of the timing packet, and the transmission distance. Further, the above-mentioned configuration enables real-time compensation of a fluctuation in the propagation delay due to dynamic switching of radio bands by an adaptive modulation system.

Third Exemplary Embodiment

Figure 6:
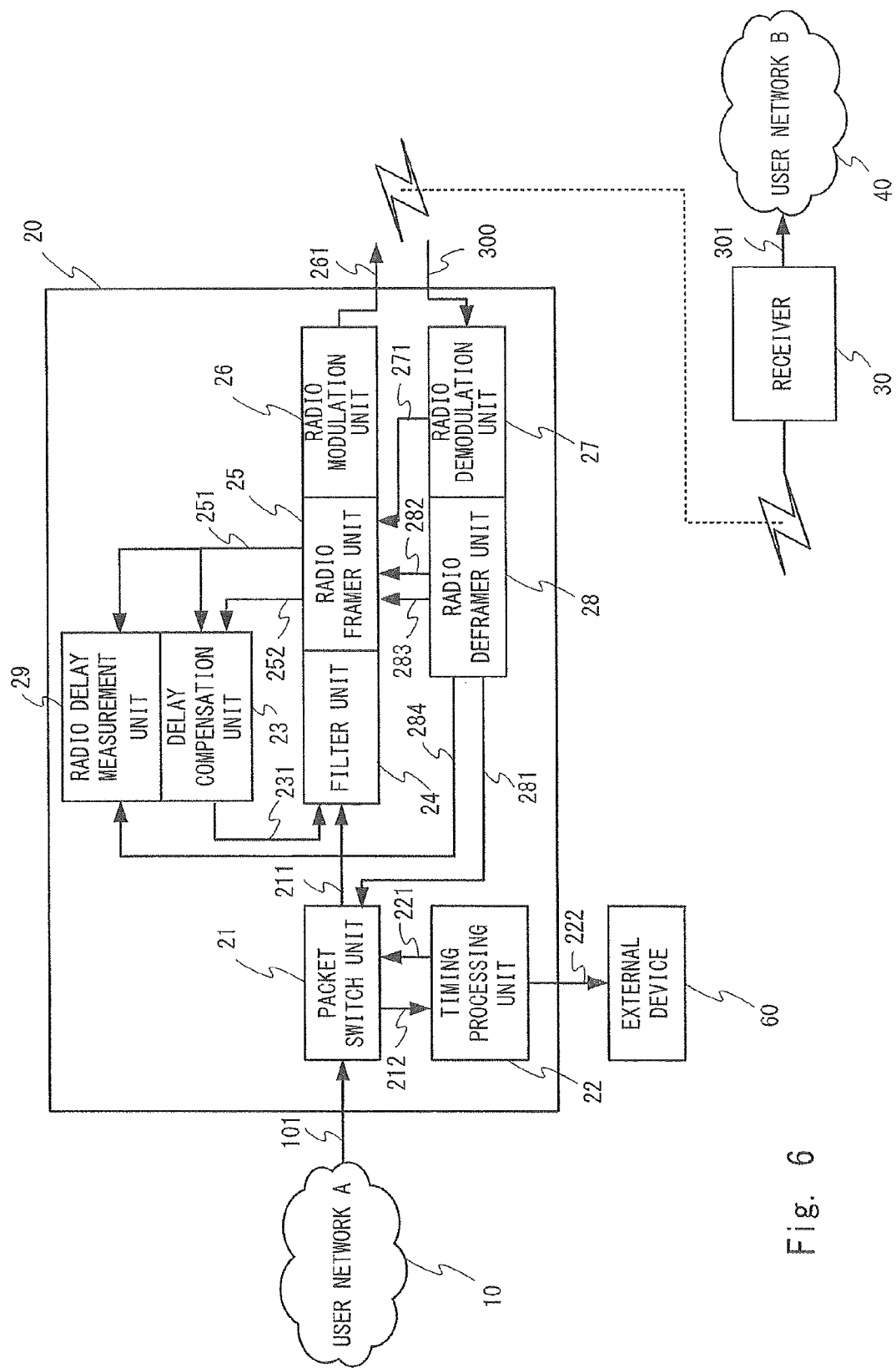
FIG. 6 is a block diagram of a transmitter according to a third exemplary embodiment.
Figure 7:
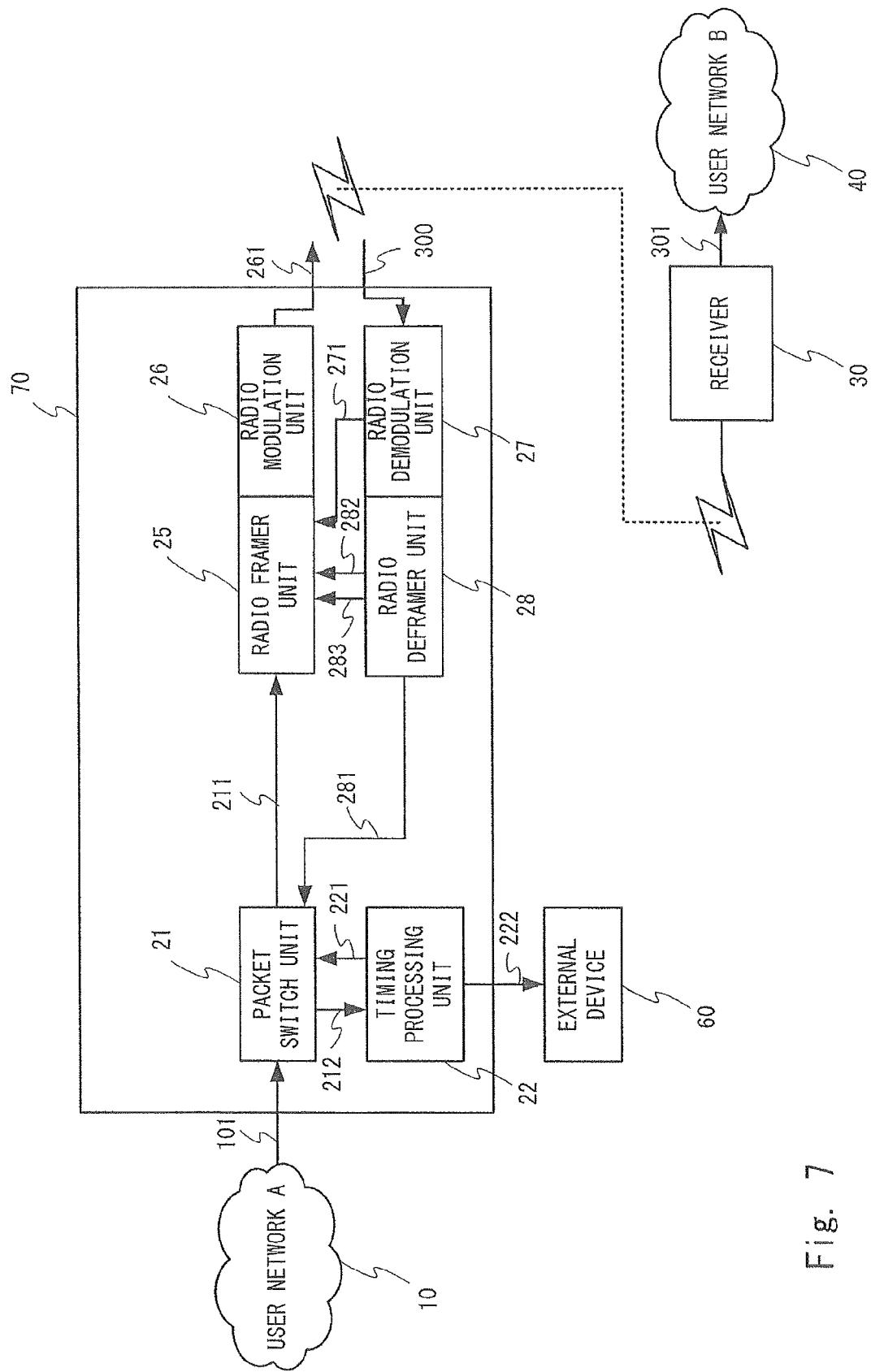
FIG. 7 is a block diagram of a transmitter of related art.

Referring to FIG. 6, the configuration of the transmitter 20 according to a third exemplary embodiment of the present invention will be described.

The transmitter 20 according to the third exemplary embodiment is characterized by including a radio delay measurement unit 29. The other components are similar to those of the first or second exemplary embodiment described above.

The radio delay measurement unit 29 receives the input of the transmission radio frame pulse signal 251 from the radio framer unit 25 and a reception radio frame pulse signal 284 from the radio deframer unit 28. The radio delay measurement unit 29 detects a propagation delay in a radio transmission section based on a phase difference between the transmission frame pulse 251 and the reception frame pulse 284, and notifies the delay compensation unit 23 of the propagation delay.

As described above, the radio framer unit 25 of this exemplary embodiment outputs the reception radio frame pulse signal 284 not only to the delay compensation unit 23, but also to the radio delay measurement unit 29.

The detection of a propagation delay in a radio transmission section will be described. Generally, during the operation state of the transmitter 20 and the receiver 30, transmission and reception radio frame pulses are unrelated. However, assuming that only for a limited period of time after power-on of the these devices, the transmitter 20 transmits the radio frame pulse in a specific modulation system and the receiver 30, which is an opposite radio station, sends back the received radio frame pulse by return, the transmitter 20 compares the phases of the transmission and reception radio frame pulses, thereby making it possible to detect the propagation delay in the radio section.

Sending back the radio frame pulse by return can be achieved by inputting the reception radio frame pulse signal 284, which is output from the radio deframer unit 28, to the radio framer unit 25. Since the receiver 30 of this exemplary embodiment has a configuration similar to that of the transmitter 20, the receiver 30 can send back the radio frame pulse by return in a manner similar to that of the transmitter 20.

The configuration described above allows the transmitter 20 of this exemplary embodiment to automatically measure a propagation delay in a radio transmission section. Accordingly, the configuration for setting a radio transmission distance as described in the second exemplary embodiment can be eliminated from the control terminal 50. The propagation delay detected by the radio delay measurement unit 29 may be held by the radio delay measurement unit 29 and the notification thereof may be given to the delay compensation unit 23, as needed, or may be stored in a predetermined storage area that is provided inside or outside of the transmitter 20 so that the delay compensation unit 23 can refer to the storage area to obtain the propagation delay.

In this exemplary embodiment, based on the packet length of the timing packet received from the input means 91, the radio modulation system, and the propagation delay detected by the radio delay measurement unit 29, the delay compensation means 93 calculates the delay compensation value, the filter means 94 adds the delay compensation value to the timing packet, and the output means 95 delivers the timing packet, thereby making it possible to perform delay compensation depending on the radio modulation system, the packet length of the timing packet, and the transmission distance. Further, the above-mentioned configuration enables real-time compensation of a fluctuation in the propagation delay due to dynamic switching of radio bands by an adaptive modulation system.

Other Exemplary Embodiment

Note that the present invention is not limited to exemplary embodiments described above, and can be modified in various manners without departing from the gist of the present invention.

Although the present invention is described as a hardware configuration in the above exemplary embodiments, the present invention is not limited to this, and any processing can be implemented by causing a CPU (Central Processing Unit) to execute a computer program. In this case, the computer program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

This application is based upon and claims the benefit of priority from Japanese patent application No. 2011-245306, filed on Nov. 9, 2011, the disclosure of which is incorporated herein in its entirety by reference.

INDUSTRIAL APPLICABILITY

The present invention relates to a transmitter, a transmission method, and a non-transitory computer-readable medium storing a program, and more particularly, to a technique for compensating for a delay in accordance with switching of a modulation system.

REFERENCE SIGNS LIST

10 USER NETWORK A
20 TRANSMITTER
21 PACKET SWITCH UNIT
22 TIMING PROCESSING UNIT
23 DELAY COMPENSATION UNIT
24 FILTER UNIT
25 RADIO FRAMER UNIT
26 RADIO MODULATION UNIT
27 RADIO DEMODULATION UNIT
28 RADIO DEFRAMER UNIT
29 RADIO DELAY MEASUREMENT UNIT
30 RECEIVER
50 CONTROL TERMINAL
60 EXTERNAL DEVICE
70 TRANSMITTER
90 TRANSMITTER
91 INPUT MEANS
93 DELAY COMPENSATION MEANS
94 FILTER MEANS
95 OUTPUT MEANS

The invention claimed is:

1. A transmitter comprising:
an input unit configured to receive an input of a timing packet from a master device;
a delay compensation unit configured to receive the timing packet forwarded by the input unit, configured to extract a packet length from the received timing packet, configured to calculate a device-specific delay value based on a modulation system type used to transmit the timing packet, configured to calculate a first propagation delay value based on the modulation system type and the extracted packet length, and further configured to calculate a delay compensation value based on the device-specific delay value and the first propagation delay value;
a filter unit configured to revise the timing packet forwarded by the input unit by adding the delay compensation value to a specific field in the forwarded timing packet; and
an output unit configured to receive the revised timing packet forwarded by the filter unit and transmit wirelessly the received timing packet to a receiver.

2. The transmitter according to claim 1, wherein the delay compensation unit further obtains a transmission distance to the receiver, calculates a second propagation delay value based on the transmission distance, and calculates the delay compensation value based on the device-specific delay value, the first propagation delay value, and the second propagation delay value.

3. The transmitter according to claim 1, further comprising a radio delay measurement unit configured to detect a phase difference between a transmission frame pulse wirelessly transmitted to the receiver by the transmitter and a reception frame pulse wirelessly transmitted by the receiver and received by the transmitter, and configured to calculate a third propagation delay value based on the phase difference,
wherein the delay compensation unit calculates the delay compensation value based on the device-specific delay value and the third propagation delay value.

4. The transmitter according to claim 1, wherein the output unit comprises:
a radio framer unit configured to determine a modulation system in the radio transmission based on a result of the radio transmission between the transmitter and the receiver, and notifying the delay compensation means of the modulation system.

5. The transmitter according to claim 4, wherein the output unit further comprises:
a radio deframer unit configured to receive a reception state signal of the radio transmission from the receiver,
wherein the radio framer unit determines a modulation system in the radio transmission based on the reception state signal.

6. The transmitter according to claim 5, further comprising:
a radio demodulation unit which receives a radio input signal from the receiver and outputs, to the radio framer unit, the received power as a radio received power signal.

7. The transmitter according to claim 6, wherein the radio deframer unit:
performs frequency conversion and demodulation on the radio input signal, thereby obtaining a radio frame;
outputs, to the input unit, a main signal packet separated from the radio frame, as a separated LAN signal;
upon detecting an error from the radio frame, outputs a radio error detection signal to the radio framer unit;
separates radio receiving power, which is detected by the receiver and is multiplexed on the radio frame, from the radio frame; and
outputs the radio receiving power to the radio framer unit as the reception state signal.

8. The transmitter according to claim 7, wherein the radio framer unit:
notifies the radio modulation unit of the modulation system;
outputs the timing packet as a radio frame;
receives the radio received power signal from the radio demodulation unit and the radio error detection signal from the radio deframer unit; and
performs processing for multiplexing bits for error detection on the radio frame.

9. The transmitter according to claim 4, further comprising:
a radio modulation unit which performs analog modulation in the radio modulation system determined by the radio framer unit and frequency conversion into a radio frequency on a radio frame generated by the radio framer unit, and outputs the radio frame to the receiver as a radio output signal.

10. The transmitter according to claim 1, wherein the input unit comprises a packet switch unit, and
wherein the transmitter further comprises a timing processing unit which reproduces a clock frequency and a time based on a time stamp value within the received timing packet, generates a timing packet to be delivered to the master device, and outputs the generated timing packet as a generated timing packet signal to the packet switch unit.

11. A transmission method comprising:
receiving a timing packet from a master device;
extracting a packet length from the received timing packet;

calculating a device-specific delay value based on a modulation system type used to transmit the timing packet;

calculating a first propagation delay value based on the modulation system type and the extracted packet length;

calculating a delay compensation value based on the device-specific delay value and the first propagation delay value;

revising the timing packet by adding the delay compensation value to a specific field in the timing packet; and wirelessly transmitting the revised timing packet to a receiver.

12. The transmission method according to claim 11, further comprising:

calculating a second propagation delay value based on a transmission distance to the receiver; and calculating the delay compensation value based on the device-specific delay value, the first propagation delay value, and the second propagation delay value.

13. The transmission method according to claim 12, wherein the transmission method is performed by a transmitter, and wherein the transmission method further comprises:

calculating a third propagation delay value based on a phase difference between a transmission frame pulse wirelessly transmitted to the receiver by the transmitter and a reception frame pulse wirelessly transmitted by the receiver and received by the transmitter; and calculating the delay compensation value based on the device-specific delay value and the third propagation delay value.

14. A non-transitory computer-readable medium storing a program for causing a computer to perform the following:

receiving a timing packet from a master device;

extracting a packet length from the received timing packet;

calculating a device-specific delay value based on a modulation system type used to transmit the timing packet;

calculating a first propagation delay value based on the modulation system type and the extracted packet length;

calculating a delay compensation value based on the device-specific delay value and the first propagation delay value;

revising the timing packet by adding the delay compensation value to a specific field in the timing packet; and wirelessly transmitting the revised timing packet to a receiver.

* * * * *